US007743649B1

(12) United States Patent
Salman et al.

(10) Patent No.: US 7,743,649 B1
(45) Date of Patent: Jun. 29, 2010

(54) CRANKING CAPABILITY ESTIMATION FOR A VEHICULAR STARTING SYSTEM

(75) Inventors: Mutasim A. Salman, Rochester Hills, MI (US); Zhenhui Yao, Warren, MI (US); Nick S. Kapsokavathis, Shelby Township, MI (US); David W. Walters, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 8 days.

(21) Appl. No.: 12/338,054

(22) Filed: Dec. 18, 2008

(51) Int. Cl.
*G01M 15/00* (2006.01)

(52) U.S. Cl. .................................................. 73/114.59

(58) Field of Classification Search ............. 73/114.58, 73/114.59, 114.62
See application file for complete search history.

(56) References Cited

U.S. PATENT DOCUMENTS 4,937,528 A 6/1990 Palanisamy
6,331,762 B1 * 12/2001 Bertness ..................... 320/134
6,445,158 B1 9/2002 Bertness et al.
6,469,512 B2 * 10/2002 Singh et al. ................. 324/426
6,885,167 B2 4/2005 Palanisamy et al.
6,885,951 B2 * 4/2005 Richter ........................ 702/63
6,909,287 B2 * 6/2005 Bertness ..................... 324/427
7,164,256 B2 * 1/2007 Mentgen et al. ............. 320/132
7,347,175 B2 * 3/2008 Lupo et al. ............... 123/179.4
7,619,417 B2 * 11/2009 Klang ........................ 324/427
2005/0285445 A1 * 12/2005 Wruck et al. ............. 307/10.1
2007/0090803 A1 * 4/2007 Yun et al. ................... 320/128
2008/0150541 A1 * 6/2008 Salman et al. ............. 324/430
2009/0045815 A1 * 2/2009 Zhang et al. ................ 324/426
2009/0184686 A1 * 7/2009 Owens et al. ............... 320/136
2009/0322283 A1 * 12/2009 Zhang et al. ................ 320/134
2009/0322340 A1 * 12/2009 Zhang et al. ................ 324/433
2010/0026306 A1 * 2/2010 Zhang et al. ................ 324/426

* cited by examiner

*Primary Examiner*—Lisa M Caputo
*Assistant Examiner*—Freddie Kirkland, III

(57) ABSTRACT

A method is provided for determining a cranking capability of a starting system for an internal combustion engine. An average power output of a battery is determined for the starting system during a start engine cranking interval. A temperature of the starting system is determined at an initiation of the start engine cranking interval. A predetermined average power output capability for a battery having a full state of charge at the determined temperature is looked up. A predetermined minimum average power output required of the battery for starting the respective engine at the determined temperature is looked up. A state of function based on the determined average power outputs is determined. The cranking capability of the starting system is identified in response to the determined state of function.

18 Claims, 4 Drawing Sheets

CRANKING CAPABILITY ESTIMATION FOR A VEHICULAR STARTING SYSTEM

BACKGROUND OF INVENTION

An embodiment relates generally to evaluating a cranking capability of a vehicle starting system.

Vehicle batteries are used for conventional functions such as starting, lighting, and ignition within a vehicle. The vehicle battery must satisfy the power needs of all the electronics associated with those functions. Many vehicle breakdowns are related to automotive electronic and battery failures such as the vehicle battery being in a low state of charge during vehicle starting. The vehicle starting system includes the battery, the starter motor, and the engine. To successfully crank the vehicle engine, the electrical power supply provided by the battery must be able to supply an adequate amount of power to the starter motor for cranking the engine. The power must not only be able to successfully initiate cranking of the starter and engine, but must be able to overcome the frictional and resistive interactions of the accessories coupling the starter motor and the engine.

The state of function (SOF) for a starting system is a comprehensive reflection of a starting system's state of health (SOH) and state of charge (SOC). The SOF provides important information regarding the cranking capability of the starting system. What is needed is a method for evaluating the SOF for the starting system for determining the cranking capability of the vehicle starting system.

SUMMARY OF INVENTION

An advantage of an embodiment is an onboard monitoring and prognosis of the state of function of the starting system by measuring the power output during a specific interval during the engine cranking operation of a vehicle to determine the cranking capability of the vehicle. Another advantage is the determination of whether the state of function is directed to the battery or starter motor.

An embodiment contemplates a method of determining a cranking capability of a starting system for an internal combustion engine: (a) an average power output of a battery for the starting system during an start engine cranking interval is determined; (b) a temperature of the starting system at an initiation of the start engine cranking interval is determined; (c) a look up is performed for a predetermined average power output capability for a battery having a full state of charge at the determined temperature; (d) a look up is performed for a predetermined minimum average power output of the battery at the determined temperature; (e) a state of function is determined based on the average power output of steps (a), (d), and (e); and (f) the cranking capability is identified of the starting system in response to the determined state of function.

An embodiment contemplates a method of determining a cranking capability of a starting system: (a) an ignition start operation is detected; (b) a temperature of the starting system at the initiation of the ignition start is determined; (c) a battery voltage and a current is measured during a predetermined interval of the ignition start; (d) an actual average power output value of the battery during the predetermined interval is determined; (e) an average power output capability for a battery having a full state of charge is determined at the determined temperature; (f) a minimum average power output value required of the battery for starting the respective engine at the determined temperatures is determined; (g) a state of function value of the starting system is calculated as a function of the average power output values determined in steps (d), (e), and (f).

An embodiment contemplates a starting performance indication system is provided for a vehicle starting system. The vehicle starting system includes an internal combustion engine, a cranking device for cranking the internal combustion engine, a coupling device for mechanically coupling the cranking device to the internal combustion engine, and an energy storage device for supplying power to the cranking device for energizing the cranking device. At least one sensing device determines a temperature of at least the energy storage device, the cranking device, and engine oil in the engine. A voltage sensing device senses the voltage output from the energy storage device. A current sensing device for sensing the current drawn by the cranking device. A control module having a starting system monitoring and prognosis routine determines a state of function of the starting system. The control module determines an average power output of the battery during the predetermined interval during engine cranking, an average power output for a battery having a full state of charge for starting the internal combustion engine at the determined temperature, and a minimum average power output value of the battery required for starting the internal combustion engine at the determined temperatures. The control module estimates the cranking capability of the starting system as function of the average power output of the battery during the predetermined interval during engine cranking as a function of the average power output for a battery having a full state of charge for starting the internal combustion engine at the determined temperature, and as a function of the minimum average power output value of the battery required for starting the internal combustion engine at the determined temperatures.

DETAILED DESCRIPTION

Figure 1:
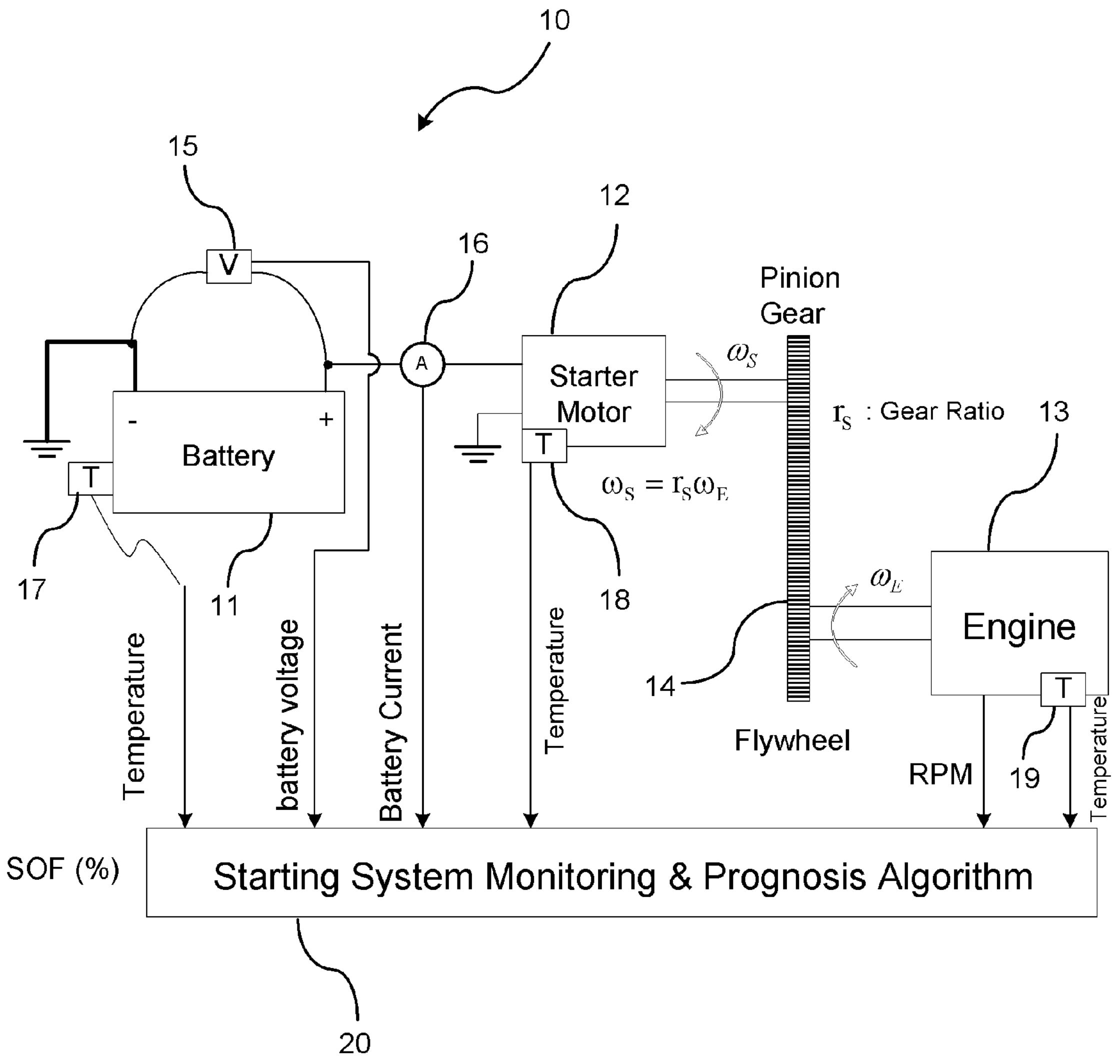
FIG. 1 is a schematic illustration of a starting system for an internal combustion engine of a vehicle.

There is shown generally in FIG. 1 a vehicle starting system 10. The starting system 10 includes a battery 11 for storing an electrical charge therein. The battery 11 provides electrical power to a starter motor 12 for cranking an internal combustion engine 13 of a vehicle. The starter motor 12 when energized engages a ring gear of a flywheel 14 that is coupled to the internal combustion engine 13 for cranking the internal combustion engine 13.

The electrical charge supplied by the battery 11 to the starter motor 12 must not only be of a sufficient charge to successfully energize the starter motor, but must supply enough power to overcome the torsion friction of meshing teeth between the pinion gear of the starter motor 12 and the ring gear of the flywheel 14, internal engine components, and air compression of the engine cylinders. Therefore, if any deficiencies are present in the starting system aside from the battery 11, then a state of function (SOF) is determined for the starting system as a whole and not just the battery 11.

A voltage sensor 15 and a current sensor 16 monitor and record the voltage and current, respectively, over a predetermined interval during engine cranking which is used to determine an average power output of the battery during engine cranking. The average power during a fixed length of time is one of the factors used to estimate the battery SOF while starting a vehicle.

Power available by the battery during engine cranking is affected by the temperature, the battery state of health (SOH), and the battery state of charge (SOC) for a specific engine. In general, the power output by the battery is higher at elevated battery temperatures, high SOC, and high SOH. This allows for a faster and easier engine turn over. The power output by the battery has to be higher than a minimum threshold value in order to successfully crank the engine. If the temperature of the engine decreases, then the minimum power required to successfully crank the engine increases. Therefore, a temperature sensor 17 is provided for monitoring a temperature of the battery 11, a temperature sensor 18 is provided for monitoring a temperature of the starter motor 12, and a temperature sensor 19 is provided for monitoring a temperature of the engine oil. Each of the temperature measurements are provided to a control module 20 which includes a starting system monitoring and prognosis routine for determining the SOF of the starting system. The control module 20 maybe any vehicle controller including, but not limited to, a battery control module.

Figure 2:
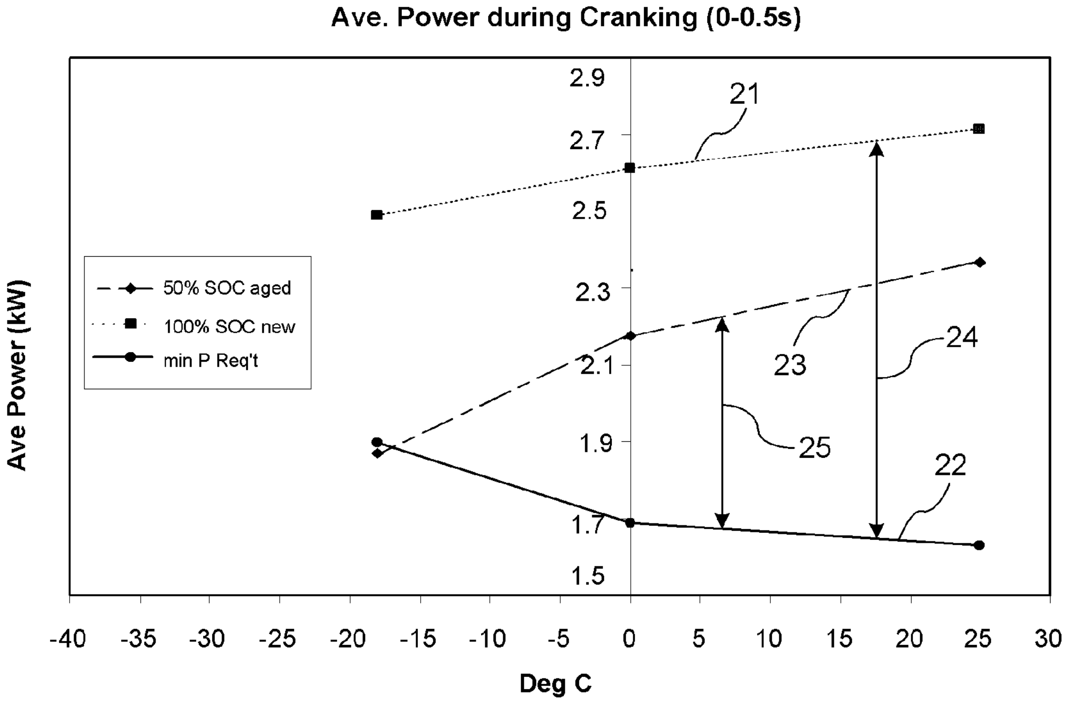
FIG. 2 is a graph of experimental cranking data of new battery and an aged battery.

FIG. 2 illustrates a graph of average battery output power curves obtained over a predetermined engine cranking interval. Plot line 21 illustrates an average battery power output curve for a new battery having a full SOC. Plot line 22 is a minimum average power output curve that is required to successfully crank the engine over the predetermined starting interval for the respective starting system. Plot line 23 illustrates the measured average power output curve for the respective battery of the starting system during the starting of the engine over the predetermined time interval. As shown in FIG. 2, a difference 24 between the plot line 22 for the minimum average power output curve and the plot line 21 for the new battery having a full SOC value at a respective temperature is compared to the difference 25 between the plot line 22 for the minimum average power output curve and the plot line 23 for the average power output of the respective battery of the starting system at the same respective temperature. The ratio of the absolute value of the difference 24 to the absolute value of the difference 25 is defined to be the percentage SOF. An equation for determining the SOF is as follows:

$$SOF = \frac{\overline{P}_b - \overline{P}_{b\_lim}}{\overline{P}_{b\_new} - \overline{P}_{b\_lim}} \times 100\% \tag{1}$$

where $\overline{P}_b$ is the average power output of the battery over a predetermined time interval, $\overline{P}_b$ is an average power output of a new battery have a full SOC that successfully cranks the engine, and $\overline{P}_{b\_lim}$, is a minimum average power output required from the battery to successfully crank the engine over the predetermined time interval for the respective starting system.

The SOF equation compares the ratio of the average power output of the current battery and a new battery having a full SOC to a minimum average power output value to establish a SOF value. The power output for a new battery having a full SOC ($\overline{P}_{b\_new}$) is provided in a look up table previously measured by experimentation. The minimum average power output ($\overline{P}_{b\_lim}$) is a function of the efficiency of the starter motor and the engine load and is determined through experimentation.

Figure 3:
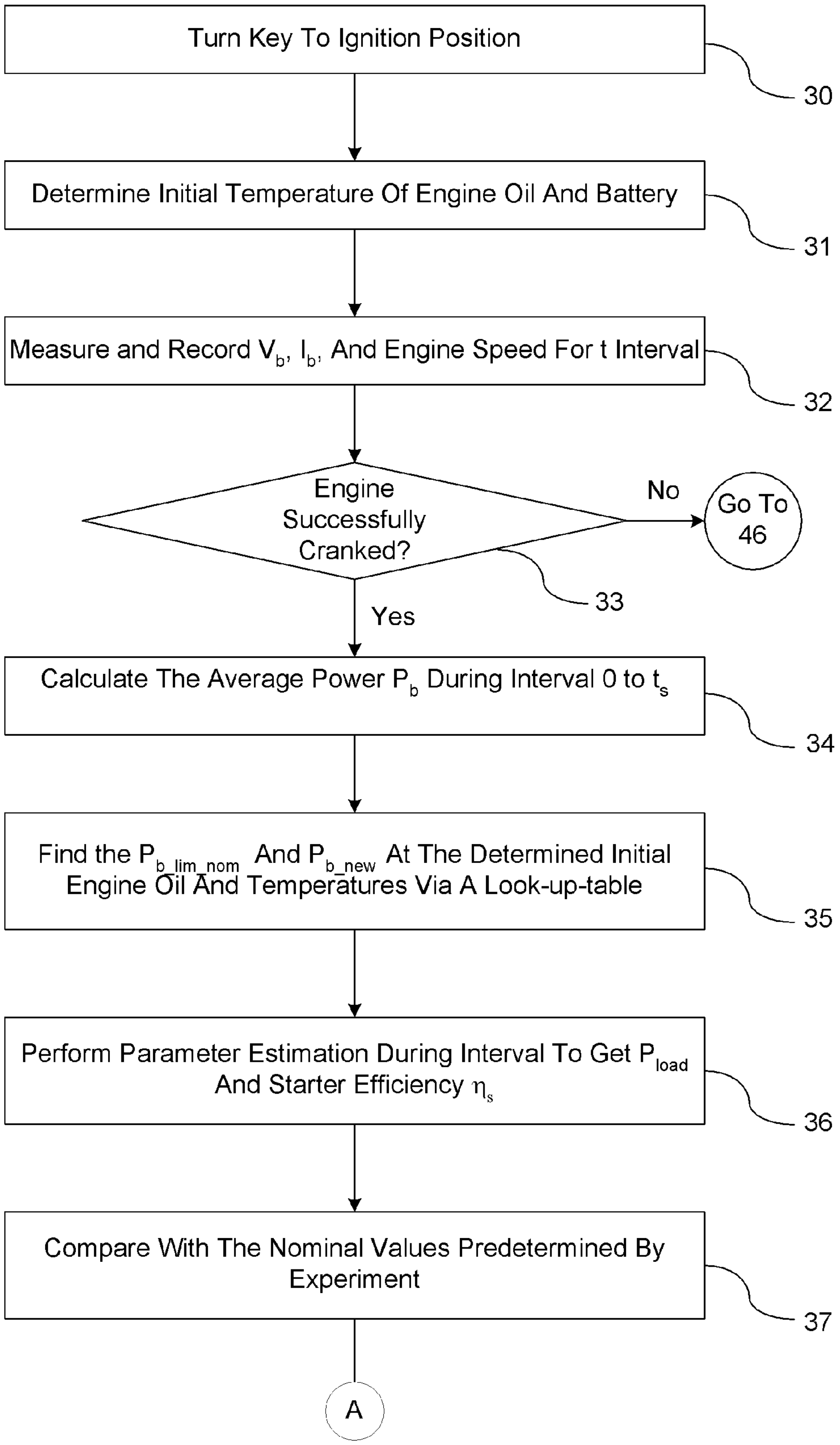
FIGS. 3-4 show a flowchart of a method for a state of function estimation technique.
Figure 4:
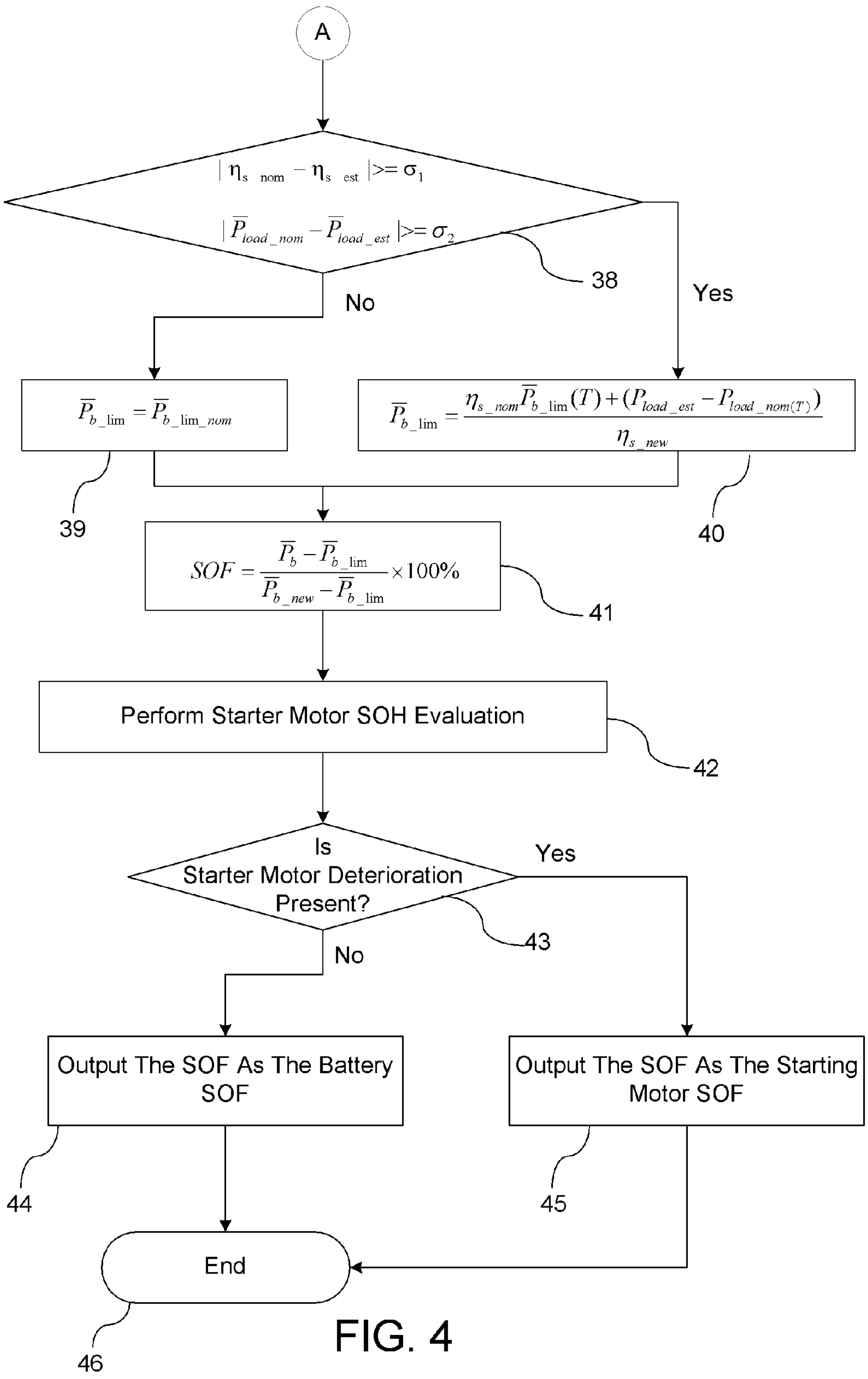

FIGS. 3 and 4 illustrate a flowchart for a SOF estimation technique. The estimation technique illustrates a method for determining the SOF, shown in equation (1), by determining various power loads required to successfully crank the engine. The following method illustrates the estimation techniques for deriving the SOF of the battery/starting system.

In step 30, the ignition key is turned to the on position to initiate cranking of the engine by the starter motor. In step 31, the temperature of the engine oil, battery, and starter motor are determined at the initiation of the engine cranking operation. It should be understood that step of determining the temperatures of the each of the devices may be performed by direct sensing/measuring the temperature of the devices, estimating the temperature of the devices, or may be determined indirectly from the measurements or estimates of other sensed devices within the vehicle.

In step 32, the output voltage $V_b$ and the output current $I_b$ of the battery is measured and recorded over a predetermined interval from the initiation of the starting engine sequence (e.g. 0-0.5 sec).

In step 33, a determination is made whether the engine is successfully cranked. If the determination is made that the engine is not successfully cranked, then the routine proceeds to step 46 where the routine terminates since the inability of the engine to crank implies the SOF is zero. If the determination is made that the engine is successfully cranked, then in step 34, an average power $\overline{P}_b$ is determined by the following equation:

$$\overline{P}_b = \frac{\sum_{i=0}^{i=n} V_b(i) I_b(i) \Delta t}{n \Delta t} = \frac{\sum_{i=0}^{i=n} V_b(i) I_b(i)}{n}. \tag{2}$$

In step 35, a minimum average power output value $\overline{P}_{b\_lim}$ and an average power output for a battery having a full state of charge $\overline{P}_{b\_new}$ are determined. The minimum average power output value $\overline{P}_{b\_lim}$ is the minimum power required by the battery to successfully crank the engine at the initiation of the cranking sequence. $\overline{P}_{b\_new}$ is the average power output by a new battery when successfully cranking the respective engine. $\overline{P}_{b\_lim}$ and $\overline{P}_{b\_new}$ are determined by a lookup table based on the respective temperatures determined in step 31.

In step 36, parameter estimation is performed for determining the $P_{load}$ and starter efficiency $\eta_s$ during the time interval of cranking the engine. $P_{load}$ is the power consumed by the load devices including of the starting system when cranking the engine. Such devices include the starter motor, engine, and other frictional and resistive interactions between the starter motor and the engine including air pressure combustion in the engine. To perform parameter estimation for $P_{load}$ and $\eta_s$, the dynamics of the starting system must be taken into consideration. The system equation of the dynamics for the starting system is represented by the following formula:

$$\left(\frac{J_e}{r^2} + J_s\right)\dot{\omega}_s = (T_s - T_{sf}) - \frac{1}{r}(T_{fe} + T_c) \tag{3}$$

where $J_e$ is the inertia of the engine, $J_s$ is the inertia of the starter motor, r is the gear ratio from the starter motor to the engine flywheel, $\omega_s$ is the starter motor rotation speed, $T_s$ is the induced starter motor torque, $T_{sf}$ is the starter motor friction torque, $T_{fe}$ is the engine friction torque, and $T_c$ is the torque introduced by the cylinder compressed air pressure.

The equivalent inertia of the engine and the starter motor as viewed at the starter motor side is represented by the following equation:

$$J_{eff} = \frac{J_e}{r^2} + J_s \tag{4}$$

therefore, the total load that must be overcome by the starter motor during cranking is represented by the equation:

$$T_{load} = T_{sf} + \frac{T_{fe} + T_c}{r}. \tag{5}$$

As a result, the system equation can be re-written as follows:

$$J_{eff}\dot{\omega}_s = T_s - T_{load}. \tag{6}$$

The system equation can be further re-written by multiplying equation (6) by the rotational speed $\omega_s$ which produces the following equation:

$$J_{eff}\omega_s\dot{\omega}_s = T_s\omega_s - T_{load}\omega_s \tag{7}$$

where $T_s\omega_s$ is the generated mechanical power by the starter motor.

The supplied electrical power is represented by the formula as follows:

$$P_b = I_b V_b. \tag{8}$$

Therefore, if the average energy conversion efficiency $\eta_s$ of the starter motor in a normal condition is assumed constant and is represented by:

$$T_s\omega_s = \eta_2 P_b = \eta_s I_b V_b \tag{9}$$

then $$J_{eff}\omega_s\dot{\omega}_s = \eta_s I_b V_b - P_{load} \tag{10}$$

where $P_{load} = T_{load}\omega_s$ is the power consumed by the load. The discrete form of Eq. 10 is approximated by the equation:

$$J_{eff}\,\omega_s(n)\frac{(\omega_s(n) - \omega_s(n-1))}{dt} = \eta_s I_b(n) V_b(n) - P_{load}. \tag{11}$$

To estimate the parameters $P_{load}$ and $\eta_s$, the following assumptions are made:

$$y(n) = J_{eff}\,\omega_s(n)\frac{(\omega_s(n) - \omega_s(n-1))}{dt} \tag{12}$$

$$x(n) = I_b(n) V_b(n) \tag{13}$$

$$a = \eta_s \tag{14}$$

$$b = -P_{load} \tag{15}$$

then equation 11 is as follows:

$$y(n) = ax(n) + b \tag{16}$$

where $\omega_s$ is r times of engine speed $\omega_e$, and $\omega_e$, $I_b$ and $V_b$ are measured signals.

Therefore y(n) and x(n) are known data sequences and equation (16) is a linear form for determining parameters a and b. Using this parameter estimation technique, the parameters a and b (i.e., $\eta_s$ and $P_{load}$) can be estimated.

Once the efficiency $\eta_s$ and average power load value $P_{load}$ is estimated, the kinetic power of the system may be determined using the following equation:

$$P_e = J_{eff}\omega_s\dot{\omega}_s \tag{17}$$

$$P_e = \eta_s P_b - P_{load} \tag{18}$$

therefore, over a fixed interval, the average kinetic power is as follows:

$$\overline{P}_e = \eta_s \overline{P}_b - \overline{P}_{load}. \tag{19}$$

It is assumed that the average kinetic power $\overline{P}_e$ has to be higher than an average kinetic power limit value $\overline{P}_{e\_lim}$ to successfully crank the engine which is dependent on a constant engine temperature. For a new engine and a new starter motor, the nominal value of average efficiency $\eta_s$ and average power load $\overline{P}_{load\_nom}$ are constant at a respective temperature. Therefore, the minimum average power supplied from the battery required to successfully crank the engine is determined by the following formula:

$$\overline{P}_{b\_lim\_nom} = \frac{P_{e\_lim} + \overline{P}_{load\_nom}}{\eta_{s\_nom}}. \tag{20}$$

If a deficiency is present in the starting system as a result of the engine or starter motor, then the average efficiency $\eta_s$ and average power load $\overline{P}_{load}$ could change significantly from the nominal values, and under such circumstances, the minimum power supplied to the starter motor from the battery has to adjust to satisfy the minimum requirement of $\overline{P}_e$.

In step 37, the nominal values for efficiency $\eta_{s\_nom}$ and average power load $\overline{P}_{load\_nom}$ are compared to the estimated values for the average efficiency $\eta_{s\_est}$ and average power load $\overline{P}_{load\_est}$, respectively. In step 38, a determination is made whether the absolute value of the difference between the estimated average efficiency $\eta_{s\_est}$ and the nominal average efficiency $\eta_{s\_nom}$ is greater than a predetermined efficiency threshold $\sigma_1$, and whether an absolute value of the difference between the nominal average power load $\overline{P}_{load\_nom}$ and the estimated average power load $\overline{P}_{load\_est}$ is greater than a predetermined power load threshold $\sigma_2$. The comparison is represented by the formulas shown below:

$$|\eta_{s\_nom} - \eta_{s\_est}| >= \sigma_1, \text{ or} \tag{21}$$

$$|\overline{P}_{load\_nom} - \overline{P}_{load\_est}| >= \sigma_2. \tag{22}$$

If the determination made in step 38 is that neither condition is greater than their comparative predetermined thresholds, then the assumption is that there is no significant change in the nominal values of the starter motor or the engine. The routine proceeds to step 39 where the minimum average power required by the battery is determined based on the following formula:

$$\overline{P}_{b\_lim} = \overline{P}_{b\_lim\_nom}. \tag{23}$$

If the determination is made in step 38 that the one of the respective conditions is greater than their comparative predetermined thresholds, then the routine proceeds to step 40 where the minimum average power required from the battery is derived from the following equation:

$$\overline{P}_{e\_lim}=\eta_{s\_nom}\overline{P}_{b\_lim\_nom}-\overline{P}_{load\_nom} \quad (24)$$

$$\overline{P}_{e\_lim}=\eta_{s\_est}\overline{P}_{b\_lim}-\overline{P}_{load\_est} \quad (25)$$

where $$\overline{P}_{b\_lim}=\frac{\eta_{s\_nom}\overline{P}_{b\_lim\_nom}+(\overline{P}_{load\_est}-\overline{P}_{load\_nom})}{\eta_{s\_est}}. \quad (26)$$

In step 41, the SOF is determined as a function of the minimum average power required by the battery determined in steps 39 or 40. The values obtained for average values of $\overline{P}_b$, $\overline{P}_{b\_lim}$, and $\overline{P}_{b\_new}$ are inserted into eq. (1) as follows:

$$SOF=\frac{\overline{P}_b-\overline{P}_{b\_lim}}{\overline{P}_{b\_new}-\overline{P}_{b\_lim}}\times 100\,\% \quad (1)$$

In step 42, state of health (SOH) analysis is performed on the starter motor. The SOH analysis determines whether any deficiencies exist with the starter motor. This assists in identifying whether the SOF should be identified as a starting system SOF or a battery SOF. A starter motor SOH module may be determined by any method can ascertain the SOH of the starter motor.

In step 43, a determination is made whether the starter motor deterioration is present. If starter motor deterioration is not found to be present, then the SOF is identified as a starter battery SOF in step 44. If starter motor deterioration is determined to be present in step 43, then the SOF is identified as a starter system SOF in step 45.

The SOF value determined in step 43 may be compared to a SOF threshold value for determining whether to actuate a warning to the driver of the vehicle identifying the cranking capability of the starting system. The warning can be any indicator (e.g. visual, audible, or haptic) for alerting the driver of a weakened starting system. The SOF threshold value may be different between vehicle models given the various sizes of the battery and the engine. Furthermore, the SOF threshold value may be different depending on the determination of whether the SOF relates to a starter system SOF or a battery SOF. In step 46, the routine terminates.

While certain embodiments of the present invention have been described in detail, those familiar with the art to which this invention relates will recognize various alternative designs and embodiments for practicing the invention as defined by the following claims.

What is claimed is:

1. A method of determining a cranking capability of a starting system for an internal combustion engine, the method comprising the steps of:

(a) determining an average power output of a battery for the starting system during a start engine cranking interval;

(b) determining a temperature of the starting system at an initiation of the start engine cranking interval;

(c) looking up a predetermined average power output capability for a battery having a full state of charge at the determined temperature;

(d) looking up a predetermined minimum average power output required of the battery for starting the respective engine at the determined temperature;

(e) determining a state of function based on the average power output of steps (a), (c), and (d); and (f) identifying the cranking capability of the starting system in response to the determined state of function.

2. The method of claim 1 wherein step (e) further comprises the steps of:

determining a difference between the average power outputs determined in steps (a) and (d);

determining a difference between the average power outputs determined in steps (c) and (d); and calculating a ratio between the determined differences.

3. The method of claim 1 further comprising the step of determining if a starter motor deficiency is present, wherein the state of function is identified as a state of function for the starting system if a starter motor deficiency is present.

4. The method of claim 3 wherein the state of function is identified as a state of function for the battery if no starter motor deficiency is present.

5. The method of claim 1 wherein the step of identifying the cranking capability includes actuating an indicator to a driver of the vehicle for identifying a weakened starting system.

6. A method of determining a cranking capability of a starting system, the method comprising the steps of:

(a) detecting an ignition start operation;

(b) determining a temperature of the starting system at the initiation of the ignition start;

(c) measuring a battery voltage and a current during a predetermined interval of the ignition start;

(d) determining an actual average power output value of the battery during the predetermined interval;

(e) determining an average power output capability for a battery having a full state of charge at the determined temperature;

(f) determining a minimum average power output value required of the battery for starting the respective engine at the determined temperature; and (g) calculating a state of function value of the starting system as a function of the average power output values determined in steps (d), (e), and (f).

7. The method of claim 6 wherein the step of identifying the cranking capability of the starting system further comprises comparing the calculated state of function value determined in step (g) to a state of function threshold value and actuating a warning signal to a driver of the vehicle for identifying a weakened starting system in response to the determined state of function value being less than the state of function threshold value.

8. The method of claim 6 further comprising the steps of:

determining whether a cranking device for cranking the engine is deteriorated;

identifying the determined state of function value as a starting system state of function value in response to a determination that the cranking device is deteriorated, otherwise, outputting the state of function value as a battery state of function value.

9. The method of claim 6 wherein the state of function is represented by the following formula:

$$SOF=\frac{\overline{P}_b-\overline{P}_{b\_lim}}{\overline{P}_{b\_new}-\overline{P}_{b\_lim}}\times 100\,\%$$

where $\overline{P}_b$ is the average power output of the battery of the starting system, $\overline{P}_{b\_new}$ is the average power output of a battery having a full state of charge, and $\overline{P}_{b\_lim}$ is the minimum average power output required by the battery to crank the vehicle engine at the determined temperature.

10. The method of claim 6 wherein the minimum average power output value required of the battery is determined as a function of the efficiency of the starting system, the load drawn by the starting system, and the kinetic power output of the starting system.

11. The method of claim 6 wherein step (b) includes measuring the temperature of the battery.

12. The method of claim 6 wherein step (b) includes measuring the temperature of the starter motor.

13. The method of claim 6 wherein step (b) includes measuring the temperature of the engine.

14. The method of claim 6 wherein step (b) includes measuring the temperature of at least one of the battery, the starter motor, and the engine.

15. A starting performance indication system for a vehicle starting system, the vehicle starting system including an internal combustion engine, a cranking device for cranking the internal combustion engine, a coupling device for mechanically coupling the cranking device to the internal combustion engine, and an energy storage device for supplying power to the cranking device for energizing the cranking device, the starting performance indication system comprising:

at least one sensing device for determining a temperature of at least the energy storage device, the cranking device, and engine oil in the engine;

a voltage sensing device for sensing the voltage output from the energy storage device;

a current sensing device for sensing the current drawn by the cranking device;

a control module having a starting system monitoring and prognosis routine for determining a state of function of the starting system, wherein the control module determines an average power output of the battery during the predetermined interval during engine cranking, an average power output for a battery having a full state of charge for starting the internal combustion engine at the determined temperature, and a minimum average power output value required of the battery for starting the internal combustion engine at the determined temperature;

wherein the control module estimates the cranking capability of the starting system as function of the average power output of the battery during the predetermined interval during engine cranking, as a function of the average power output for a battery having a full state of charge, and as a function of the minimum average power output value required of the battery for starting the internal combustion engine.

16. The starting performance indication system of claim 15 further comprising a warning indicator for providing a cranking capability warning to the driver of the vehicle in response to the control module determining the state of function being a weakened state.

17. The starting performance indication system of claim 15 wherein the control module estimates the cranking capability of the starting system by comparing a calculated state of function to a state of function threshold value, the calculated state of function value being determined by the following formula:

$$SOF = \frac{\overline{P}_b - \overline{P}_{b\_lim}}{\overline{P}_{b\_new} - \overline{P}_{b\_lim}} \times 100\,\%$$

where $\overline{P}_b$ is the average power output of the battery over a predetermined time interval, $\overline{P}_{b\_new}$ is an average power output of a new battery have a full SOC that successfully cranks the engine, and $P_{b\_lim}$ is a minimum average power output value required of the battery to successfully crank the engine over the predetermined for the respective starting system.

18. The starting performance indication system of claim 15 wherein the control module includes a battery control module.

* * * * *